United States Patent [19]

Bowman et al.

[11] 3,930,541
[45] Jan. 6, 1976

[54] FLAME PREVENTION SYSTEM FOR FUEL TANK FIRES

[75] Inventors: Donald W. Bowman, Bowling Green, Ohio; Robert C. Doetsch, Roseville, Mich.; Francis S. Lemmer, Detroit, Mich.; Edward C. Zobel, Brighton, Mich.

[73] Assignee: The United States of America as represented by the Secretary of the Army, Washington, D.C.

[22] Filed: Oct. 22, 1974

[21] Appl. No.: 516,939

[52] U.S. Cl. .................. 169/62; 169/66; 169/11
[51] Int. Cl.² ........................................ A62C 13/40
[58] Field of Search ............... 169/62, 5, 66, 26, 11

[56] References Cited
UNITED STATES PATENTS

| | | | |
|---|---|---|---|
| 2,317,836 | 4/1943 | Weaver | 169/66 X |
| 2,798,562 | 7/1957 | Randolph et al. | 169/66 X |
| 3,738,428 | 6/1973 | Ingro | 169/62 X |
| 3,835,930 | 9/1974 | Denigan, Jr. et al. | 169/66 |
| R26,020 | 5/1966 | Powell | 169/66 |

Primary Examiner—Evon C. Blunk
Assistant Examiner—Michael Mar
Attorney, Agent, or Firm—John E. McRae; Peter A. Taucher; Robert P. Gibson

[57] ABSTRACT

A device is needed to rapidly suppress gasoline fuel fires which are started as a result of the rupture of military vehicle fuel tanks by armor-piercing projectiles. The present invention contemplates a fuel fire suppressing device in the form of two hollow panels pressurized with a fire suppressant substance, such as Halon 1301; the panels are located in the path that an enemy projectile would take during passage through the fuel tank. The opening formed in each panel by the projectile permits automatic discharge of the pressurized suppressant onto the fuel escaping from the tank.

2 Claims, 5 Drawing Figures

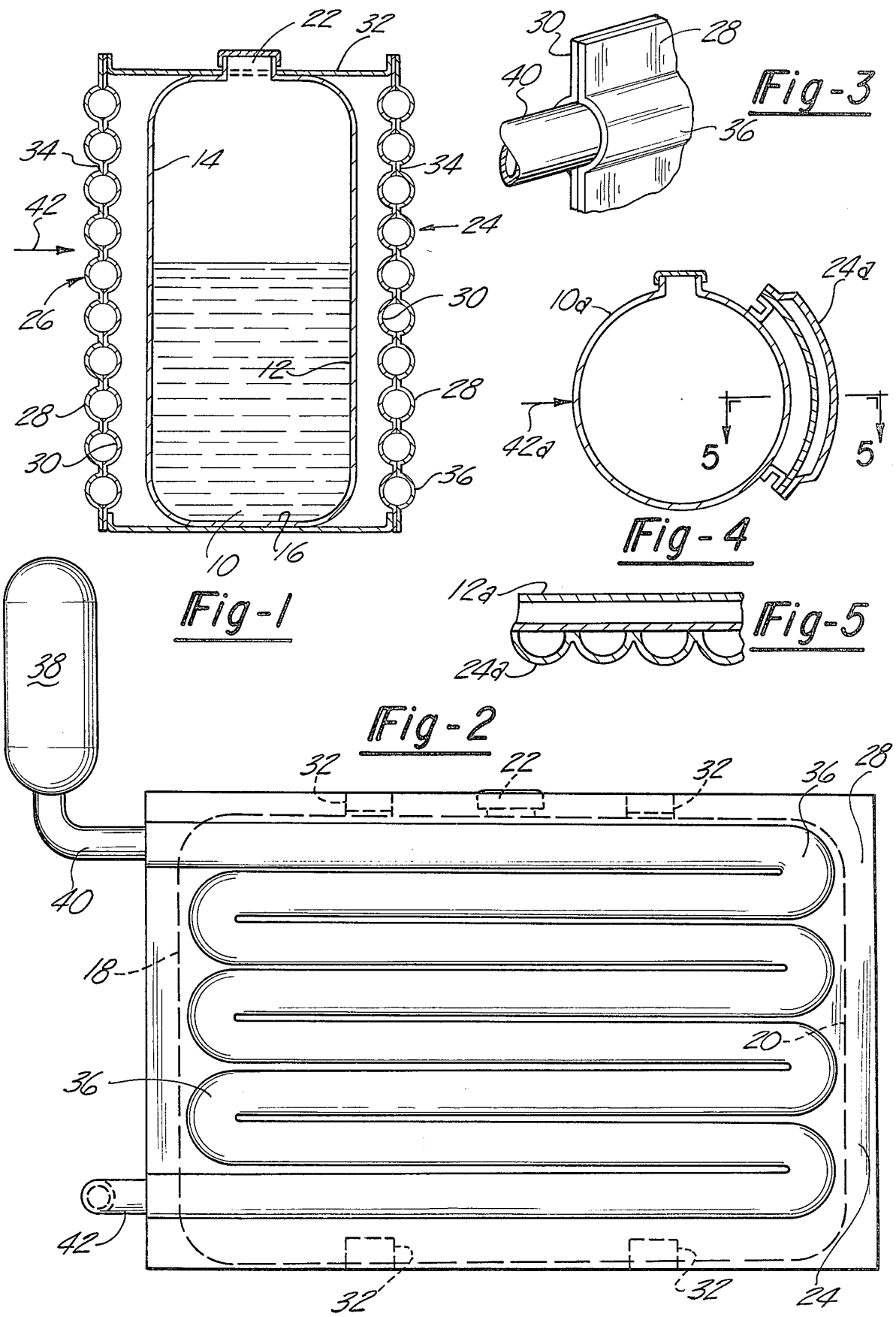

FLAME PREVENTION SYSTEM FOR FUEL TANK FIRES

The invention described herein may be manufactured, used, and licensed by or for the Government for governmental purposes without payment to us of any royalty thereon.

BACKGROUND OF THE INVENTION

Various devices and systems have been designed to suppress fires started by rupture of fuel tanks by armor-piercing shells. These have been principally based on methods whereby a device which detects the flame automatically releases a suppressant, such as freon. Infra-red and ultra-violet optical detectors and thermocouple heat detectors have been the most common devices for this purpose, although wire grids have also been used to detect the passage of the shell. Electrically-operated and squib-operated valves have been tried as means of release of the suppressant from a more or less remote storage cylinder through the nozzle to the point of flame.

Conventional detection and triggering devices require a lapse of time after fuel tank rupture and flame start, and consequently, may allow a fire to get too much of a start or to produce hot spots which can ignite secondary fires, even though the original fire was extinguished. Extremely rapid suppression is especially important in gasoline fires. All optical and thermal flame detection and triggering devices exhibit finite even though short delay times. Further time is required for valving and travel of the suppressant from the cylinder through the nozzle to the seat of the flame. As examples of the times involved: the electronic amplifier requires about 6 milliseconds, a squib-operated valve 5 ms or less, an electronically actuated valve approximately 50 ms, and flow through the nozzle after release uses from 88 to 200 ms, depending on the distance to the flame. Thus, the over-all delay time is between 100 and 300 milliseconds. Added to this is the time for the fireball to develop to the point where the detector is activated. This latter can only be eliminated by the use of grid detector placed on the fuel tank.

THE PRESENT INVENTION

The present invention causes the actual rupture of the tank to release the suppressant gas at the point of rupture. In this plan, the suppressant becomes mixed with the fuel upon its release from the fuel tank. The time lag between rupture and suppressant action is reduced to the ultimate minimum, with the almost immediate elimination of flame and consequent reduction of hot spots which might ignite a secondary fire. The fuel tank is at least partially surrounded by a casing containing the suppressant material. Thus, if a shell pierces the tank, it will also rupture the casing and release suppressant gas into and round the escaping fuel, thus quenching any fire which is started by the hot shell.

THE DRAWINGS

FIG. 1 is a sectional view taken through a rectangular fuel tank partially enclosed by fire-suppressant panels or casings as contemplated under the invention.

FIG. 2 is an elevational view of a fire-suppressant panel embodying the invention.

FIG. 3 is a fragmentary view illustrating a structural detail.

FIG. 4 is a sectional view taken through a cylindrical fuel tank having a fire-suppressant panel associated therewith.

FIG. 5 is a fragmentary view taken on line 5—5 in FIG. 4.

FIGS. 1 and 2

FIG. 1 shows an upright rectangular fuel tank 10 having two major side walls 12 and 14, and a bottom wall 16. FIG. 2 shows the tank end walls 18 and 20. The top wall of the tank is provided with a filler opening 22. The fuel tank structure is conventional.

Associated with fuel tank 10 are two hollow fire-suppressant panels or containers 24 and 26, each panel having substantially the same face area as the adjacent tank wall 12 or 14. Each panel comprises two embossed metal sheets 28 and 30 bonded together at their peripheral edge areas and at other areas to define connected hollow spaces adapted to contain pressurized fire-suppressant material, such as Freon or Halon 1301. The hollow panels can be positioned in close proximity to the tank side walls 18 and 20 by any suitable mounting means, such as the four bracket arms 32 shown in the illustrative drawings.

As seen in FIG. 2, the embossed areas 36 of the bonded sheets are of serpentine shape to form a single hollow interior space. The contacting surfaces 34 of the sheets are bonded together to rigidify the panel against the internal pressure of the fire-suppressant material.

A thick-walled cylinder or bottle 38 may be connected to the interior hollow space within the panel to provide a reserve or additional supply of pressurized suppressant. As shown in FIGS. 2 and 3, the bottle-panel connection comprises a right angle tube 40 inserted into the embossed portions 36 of the panel. Any suitable method of connection that provides sufficient flow cross section can be used. A second connector tube 42 may be inserted into the other (lower) end of the embossed portion 36 to operatively connect panel 24 to panel 26. Tube 42 extends from panel 24 along the tank end wall 18 to a suitable connection with the embossed sheet areas of panel 26.

The FIG. 1 assembly may be assembled into the vehicle in an upright position, with panel 26 facing the outer side area of the vehicle, and with panel 24 facing the inner passenger compartment area of the vehicle. Enemy projectiles moving in the arrow 42 direction (FIG. 1) will successively pass through panel 26, the the tank walls 14 and 12, and panel 24, thereby rupturing the embossed areas of the panels and permitting the pressurized fire-suppressant to automatically discharge into the ambient atmosphere to quench any flames tending to develop from the fuel tank leakage caused by the projectile.

In general, panel 26 will suppress fires initiated at the outer side areas of the vehicle, and panel 24 will suppress fires initiated in or near the passenger compartment area. If the first-mentioned fires are considered to be of minor importance, then panel 26 can be omitted.

Bottle 38 and connector 42 are considered to be auxiliary "reserve flow" devices for maintaining flow of suppressant for added time intervals beyond which the flow would otherwise stop. Thus bottle 37 acts to continue the flow through any openings the projectile might form in panel 24. Connector 42 feeds suppressant to panel 26 after its capacity has been exhausted. Bottle 38 and connector 42 may be omitted if the "reserve flow" feature is considered unnecessary.

Differently shaped fuel tanks will dictate differently shaped fire-suppressant panels. FIGS. 4 and 5 illustrate the invention applied to a cylindrical fuel tank 10a. In this case, a single curved fire-suppressant panel 24a is located on the passenger compartment side of the tank to intercept projectiles passing transversely through the tank walls in the direction denoted by numeral 42a. The panel(s) would, in practice, span or extend wholly or partially around the fuel tank in accordance with the fuel tank configuration, the tank area exposed to enemy fire, the location of the passemger compartment in relation to the fuel tank, and the protection level desired.

The invention is believed advantageous in that it places the suppressant at or very close to the ignition point; additionally, the suppressant is applied to the point of ignition almost instantaneously before the flame has had an opportunity to develop. Also, the suppressant has an opportunity to intimately mix with the fuel as it spills out of the ruptured tank area, thereby tending to prevent secondary ignition of the spilled fuel after it has flowed away from the tank.

We wish it to be understood that we do not desire to be limited to the exact details of construction shown and described for obvious modifications will occur to a person skilled in the art.

We claim:

1. In a military vehicle, equipped with a rectangular fuel tank having two generally parallel major walls: the improvement comprising means to suppress fuel fires initiated as a result of fuel tank rupture by armor-piercing projectiles; said fire suppressing means comprising two hollow panels located in near adjacency to the major walls of the fuel tank in the path that an enemy projectile would take during transverse passage through the tank walls, and pressurized suppressant within the panels for automatic discharge to the ambient atmosphere through openings formed in the panel by the projectile.

2. In a military vehicle having the improvement of claim 1: the combination further comprising a tubular connector joining the hollow spaces within the panels, and a suppressant-charged bottle communicating with the hollow space within one of the panels.

* * * * *